United States Patent Office 3,214,476
Patented Oct. 26, 1965

3,214,476
STABILIZED FORMALDEHYDE SOLUTIONS
George N. Butter, Terre Haute, Ind., assignor to Commercial Solvents Corporation, New York, N.Y., a corporation of Maryland
No Drawing. Filed Mar. 5, 1962, Ser. No. 177,267
14 Claims. (Cl. 260—606)

My invention relates to stabilized formaldehyde solutions. More particularly my invention relates to formaldehyde solutions stabilized against excessive polymerization and to a method for stabilizing formaldehyde solutions.

Formaldehyde, a product used in large quantities in the chemical industry, is generally transported as a 35–50% aqueous solution. Transportation of such solutions, however, is aggravated by the tendency of formaldehyde to polymerize and then settle out as a polymerized solid from the solution. Polymerization and concurrent deposition increase with decreases in temperature. Thus, during the cold seasons transportation of concentrated formaldehyde solutions becomes impractical.

Various procedures have been attempted to minimize polymerization and solid deposition in formaldehyde solutions. For example, very low concentrations of formaldehyde in the solution on the order of 5–10% can be transported even in cold weather without excessive polymerization and deposition. However, since water is the main component, this method is practical only when small amounts of formaldehyde are transported. Also, various preservatives such as methanol, when incorporated in amounts of about 5–20% into the formaldehyde solution, have demonstrated ability to impede polymerization even when used with concentrations of formaldehyde as high as 35–50%. The addition of such large amounts of methanol, however, not only is costly but necessitates separation of the methanol from the formaldehyde solution before use can be made of the formaldehyde. More recently it has been found that small amounts of hydroxylamine hydrochloride impede but do not completely prevent polymerization of formaldehyde and deposition from the aqueous solution of the solid polymerized material even under low temperature conditions. However, the difficulty in using hydroxylamine hydrochloride is that the material which does polymerize and settle as a solid deposit from the formaldehyde solution on subjection to lower temperature does not return to solution with a subsequent rise in temperature thus resulting not only in loss of material but necessitating the separation of the polymerized solid material from the formaldehyde solution.

I have now discovered a means whereby formaldehyde solutions of industrial concentrations can be substantially preserved against polymerization and deposition of solid material even when subjected to temperatures at which uninhibited formaldehyde solutions deposit substantial amounts of polymerized formaldehyde. More important, however, my invention permits ready resolution of polymerized formaldehyde which has been deposited at low temperatures merely by slightly raising the temperature of the solution.

Generally my invention involves addition of polymerization retarding amounts of compounds produced by contacting an amide having the folowing general formula:

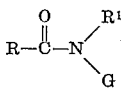

wherein R is the residue of a carboxylic acid having not less than 7 carbon atoms, $R^1$ is lower alkyl and hydrogen, and G is a glycityl radical having at least 5 carbon atoms with a monoepoxyalkylene oxide.

The amide starting materials which are utilized in preparing my new inhibitors can be prepared by the condensation of a long-chain carboxylic acid having at least 8 carbon atoms with a glycamine having the following general formula:

wherein $R^1$ and G are defined as above. Representative amides which can be utilized in preparing my new inhibitors include N-glucatylstearoylamide, N-methyl-N-glucatyloleoylamide, N-methyl-N-glucatylstearoylamide, N-methyl - N - glucatyllauroylamide, N - methyl - N - glucatylcaproylamide, N - methyl - N - glucatylcapryloylamide, N-butyl-N-glucatyloleoylamide, N-isopropyl-N-glucatyllauroylamide, N - methyl - N - galactatylstearoylamide, N-methyl-N-fructatylstearoylamide, N-methyl-N-glucatyltricontanoylamide, N-methyl-N-arabatylstearoylamide, etc., and the like. Representative monoepoxy alkylene oxides found to be useful in preparing my new inhibitors are ethylene oxide, butene-1-oxide, isobutylene oxide, propylene oxide, etc., and the like.

Generally in preparing my new inhibitors, I can employ temperatures ranging from about 0 to about 75° C. At temperatures around or above 75° C., interfering side reactions occur in the oxyalkylation reaction which greatly reduce the yields of my new inhibitors. Temperatures below 0° C., even though allowing formation of my new inhibitors, are not economically practical due to the requirements for expensive cooling equipment. While a broad range of 20–60° C. is suitable for my process, I generally prefer to utilize temperatures ranging from about 30 to about 50° C. In order to obtain a more uniform reaction, I generally also prefer to use a solvent for the amide, the said solvent being inert to the reactants and the reaction products. Examples of such solvents include benzene, chloroform, isopropyl ether, dioxane and the like.

The mole ratios of monoepoxy alkylene oxide to amides which can be used in preparing my inhibitors will naturally vary depending upon the amide and the monoepoxy alkylene oxide utilized. Generally, in most instances, I prefer to utilize from about 1 to about 10 moles of monoepoxy alkylene oxide for every mole of amide.

In carrying out my improved process, I have found that when amounts as low as 5 p.p.m. and as high as 500 p.p.m. by weight of my inhibitors, based on the weight of the formaldehyde solution are incorporated in the formaldehyde solutions, suitable results can be obtained. However, to obtain optimum results, I usually prefer to utilize from about 25 to about 250 p.p.m. of my inhibitors.

Example I

To a 1,000 ml. portion of 44% formaldehyde solution containing 1% methanol was added 1.25 ml. of a methanol solution containing the oxyalkylation product of N-methyl-N-glucatyllauroylamide and ethylene oxide to give a formaldehyde solution containing 50 p.p.m. of the oxyalkylation product. The thus treated solution and a 1,000 ml. portion of 44% formaldehyde solution containing 1% methanol but no oxyalkylation product were heated to about 100° F. and maintained at that temperature for 30 days. At the end of the 30-day period, the two portions were observed. The first portion containing the inhibitor showed only a small amount of solid deposition while the second portion containing no inhibitor was quite cloudy and showed a great deal of solid deposition. The temperature of the two portions was then lowered to 60° F. and solid deposition occurred in each portion. The two portions were then heated to 120° F. with accompanying agitation. The solid material in the inhibited portion was observed to have substantially disappeared while the solid material in the portion not treated with the inhibitor was observed to be substantially unchanged.

Example II

The procedure of Example I was followed except that the oxyalkylation product of N-methyl-N-glucatyloleoylamide and ethylene oxide was utilized instead of the oxyalkylation product of N-methyl-N-glucatyllauroylamide and ethylene oxide. Results similar to those of Example I were obtained.

Example III

The procedure of Example I was followed with the exception that the oxyalkylation product of N-methyl-N-glucatylstearoylamide and ethylene oxide was utilized instead of the oxyalkylation product of N-methyl-N-glucatyllauroylamide and ethylene oxide. Results similar to those of Example I were obtained.

Example IV

The procedure of Example I was utilized except that the oxyalkylation product of ethylene oxide and N-methyl-N-glucatylcapryloylamide was utilized instead of the oxyalkylation product of ethylene oxide and N-methyl-N-glucatyllauroylamide. Results similar to those of Example I were obtained.

Example V

The procedure of Example I was followed with the exception that the oxyalkylation product of N-butyl-N-glucatylcaproylamide and ethylene oxide was utilized instead of the oxyalkylation product of N-methyl-N-glucatyllauroylamide and ethylene oxide. Results similar to those of Example I were obtained.

Example VI

The procedure of Example I was followed with the exception that the oxyalkylation product of N-methyl-N-fructatyloleoylamide and ethylene oxide was utilized instead of the oxyalkylation product of N-methyl-N-glucatyllauroylamide and ethylene oxide. Results similar to those of Example I were obtained.

Example VII

The procedure of Example I was followed with the exception that the oxyalkylation product of N-methyl-N-galactatylstearoylamide and butene-1-oxide was utilized instead of the oxyalkylation product of N-methyl-N-glucatyllauroylamide and ethylene oxide. Results similar to those of Example I were obtained.

Example VIII

The procedure of Example I was followed with the exception that the oxyalkylation product of N-isopropyl-N-glucatyllauroylamide and isobutylene oxide was utilized instead of the oxyalkylation product of N-methyl-N-glucatyllauroylamide and ethylene oxide. Results similar to those of Example I were obtained.

Example IX

The procedure of Example I was followed with the exception that the oxyalkylation product of N-methyl-N-glucatyltricontaneoylamide and propylene oxide was utilized instead of the oxyalkylation product of N-methyl-N-glucatyllauroylamide and ethylene oxide. Results similar to those of Example I were obtained.

Example X

The procedure of Example I was followed with the exception that the oxyalkylation product of N-methyl-N-arabatylstearoylamide and ethylene oxide was utilized instead of the oxyalkylation product of N-methyl-N-glucatyllauroylamide and ethylene oxide. Results similar to those of Example I were obtained.

Now having described my invention, what I claim is:

1. An aqueous formaldehyde solution comprising aqueous formaldehyde and a sufficient amount of a compound prepared by the oxyalkylation of an amide having the following general formula:

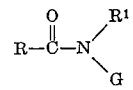

wherein R is the residue of a fatty acid having at least 7 carbon atoms, wherein R¹ is selected from the group consisting of hydrogen and lower alkyl, and wherein G is a glycityl radical having at least 5 carbon atoms with a monoepoxy alkylene oxide up to 4 carbon atoms to stabilize said solutions against deposition of solid material from the solution.

2. An aqueous formaldehyde solution comprising aqueous formaldehyde and a sufficient amount of a product prepared by the oxyalkylation of a compound having the following general formula:

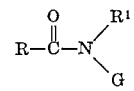

wherein R is the residue of a fatty acid having at least 7 carbon atoms, wherein R¹ is selected from the group consisting of hydrogen and lower alkyl, and wherein G is a glycityl having at least 5 carbon atoms with a monoepoxy alkylene oxide selected from the group consisting of ethylene oxide, butene-1-oxide, isobutylene oxide, and propylene oxide, to stabilize said solution against deposition of solid material from the solution.

3. An aqueous formaldehyde solution comprising aqueous formaldehyde and a sufficient amount of a compound prepared by the oxyalkylation of N-methyl-N-glucatyllauroylamide and ethylene oxide to stabilize said solution against deposition of solid material from the solution.

4. An aqueous formaldehyde solution comprising aqueous formaldehyde and a sufficient amount of a compound prepared by the oxyalkylation of N-methyl-N-glucatyloleoylamide with ethylene oxide to stabilize said solution against deposition of polymerized formaldehyde from the solution.

5. An aqueous formaldehyde solution comprising aqueous formaldehyde and a sufficient amount of a compound prepared by the oxyalkylation of N-methyl-N-glucatylstearoylamide with ethylene oxide to stabilize said solution against deposition of polymerized formaldehyde from the solution.

6. An aqueous formaldehyde solution comprising aqueous formaldehyde and a sufficient amount of a compound prepared by the oxyalkylation of N-methyl-N-glucatylcapryloylamide with ethylene oxide to stabilize said solution against deposition of polymerized formaldehyde from the solution.

7. An aqueous formaldehyde solution comprising aqueous formaldehyde and a sufficient amount of a compound prepared by the oxyalkylation of N-butyl-N-glucatylcaproylamide with ethylene oxide to stabilize said solution against deposition of polymerized formaldehyde from the solution.

8. An aqueous formaldehyde solution comprising aqueous formaldehyde and a sufficient amount of a compound prepared by the oxyalkylation of N-methyl-N-galactatylstearoylamide with butene-1-oxide to stabilize said solution against deposition of polymerized formaldehyde from the solution.

9. An aqueous formaldehyde solution comprising aqueous formaldehyde and a sufficient amount of a compound prepared by the oxyalkylation of N-methyl-N-fructatyloleoylamide with isobutylene oxide to stabilize said solution against deposition of formaldehyde from the solution.

10. An aqueous formaldehyde solution comprising aqueous formaldehyde and a sufficient amount of a compound prepared by the oxyalkylation of N-isopropyl-N-glucatyllauroylamide with propylene oxide to stabilize said solution against deposition of polymerized formaldehyde from the solution.

11. An aqueous formaldehyde solution comprising aqueous formaldehyde and a sufficient amount of a compound prepared by the oxyalkylation of N-glucatylstearoylamide and ethylene oxide to stabilize said solution against deposition of polymerized formaldehyde from the solution.

12. An aqueous formaldehyde solution comprising aqueous formaldehyde and from about 5 p.p.m. to about 500 p.p.m. of a compound prepared by the oxyalkylation of a compound having the following general formula:

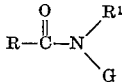

wherein R is the residue of a fatty acid having not less than 7 carbon atoms, wherein $R^1$ is selected from the group consisting of hydrogen and lower alkyl, and wherein G is a glycityl radical having at least 5 carbon atoms with a monoepoxy alkylene oxide selected from the group consisting of ethylene oxide, butene-1-oxide, isobutylene oxide, and propylene oxide.

13. The solution of claim 1 wherein $R^1$ is hydrogen, R is a residue of a fatty acid having 7 to 30 carbon atoms, and G is a glycityl radical of 5 to 6 carbon atoms.

14. The solution of claim 1 wherein $R^1$ is lower alkyl, R is a residue of a fatty acid having 7 to 30 carbon atoms, and G is a glycityl radical of 5 to 6 carbon atoms.

References Cited by the Examiner
UNITED STATES PATENTS

| | | | |
|---|---|---|---|
| 2,000,152 | 5/35 | Walker | 260—606 |
| 3,137,736 | 6/64 | Prinz et al. | 260—606 |

LEON ZITVER, *Primary Examiner.*